(12) United States Patent
Doepfert et al.

(10) Patent No.: US 10,302,146 B2
(45) Date of Patent: May 28, 2019

(54) JAW CLUTCH

(71) Applicant: ZF Friedrichshafen AG, Friedrichshafen (DE)

(72) Inventors: Hagen Doepfert, Lindau (DE); Oliver Bayer, Lindau (DE); Peter Tiesler, Meckenbeuren (DE); Harald Stier, Bodnegg (DE)

(73) Assignee: ZP FRIEDRICHSHAFEN AG, Friedrichshafen (DE)

( * ) Notice: Subject to any disclaimer, the term of this patent is extended or adjusted under 35 U.S.C. 154(b) by 165 days.

(21) Appl. No.: 15/536,850

(22) PCT Filed: Nov. 19, 2015

(86) PCT No.: PCT/EP2015/077029
§ 371 (c)(1),
(2) Date: Jun. 16, 2017

(87) PCT Pub. No.: WO2016/096311
PCT Pub. Date: Jun. 23, 2016

(65) Prior Publication Data
US 2017/0328419 A1 Nov. 16, 2017

(30) Foreign Application Priority Data
Dec. 19, 2014 (DE) ................. 10 2014 226 611

(51) Int. Cl.
*F16D 11/14* (2006.01)
*F16D 25/061* (2006.01)
*F16D 11/00* (2006.01)

(52) U.S. Cl.
CPC ............ *F16D 11/14* (2013.01); *F16D 25/061* (2013.01); *F16D 2011/006* (2013.01); *F16D 2300/18* (2013.01)

(58) Field of Classification Search
None
See application file for complete search history.

(56) References Cited

U.S. PATENT DOCUMENTS

| 5,667,330 A | 9/1997 | Henkel et al. |
| 6,000,294 A | 12/1999 | Jackson et al. |
| 6,422,363 B1 | 7/2002 | Olsson et al. |

(Continued)

FOREIGN PATENT DOCUMENTS

| DE | 69813879 T2 | 12/2003 |
| DE | 102009026707 A1 | 12/2010 |

(Continued)

OTHER PUBLICATIONS

German Search Report DE102014226611.4, dated Sep. 25, 2015. (9 pages).

(Continued)

*Primary Examiner* — Timothy Hannon
(74) *Attorney, Agent, or Firm* — Dority & Manning, P.A.

(57) ABSTRACT

A dog clutch (10) includes a piston (22) that is firmly connected to a sensor bolt (48) at one axial end of the sensor bolt (48). The piston (22) is coaxially aligned with the sensor bolt (48), and the sensor bolt (48) is configured as a sensor element for a position sensor (70) at a sensor section (52) of the sensor bolt (48) that is positioned on a free, piston-remote axial end (78) of the sensor bolt (48).

17 Claims, 3 Drawing Sheets

(56) References Cited

U.S. PATENT DOCUMENTS

| | | |
|---|---|---|
| 8,460,144 B2 | 6/2013 | Ziemer |
| 8,808,127 B2 | 8/2014 | Seidl et al. |
| 8,894,532 B2 | 11/2014 | Ziemer |
| 2002/0091036 A1 | 7/2002 | Bott et al. |
| 2003/0164278 A1 | 9/2003 | Knecht et al. |
| 2010/0276245 A1* | 11/2010 | Umeno ............... F16D 11/10 192/69.81 |
| 2012/0085616 A1 | 4/2012 | Ziemer |
| 2013/0334001 A1* | 12/2013 | Albrecht ............. F16D 11/14 192/69.7 |
| 2014/0116180 A1 | 5/2014 | Keller et al. |
| 2017/0248172 A1* | 8/2017 | Weidemann ......... F16D 11/14 |

FOREIGN PATENT DOCUMENTS

| | | |
|---|---|---|
| DE | 102009026708 A1 | 12/2010 |
| DE | 102009056088 A1 | 9/2011 |
| DE | 102011077748 A1 | 12/2012 |
| DE | 102011082818 A1 | 3/2013 |
| DE | 102012202496 A1 | 8/2013 |
| EP | 2438320 | 4/2012 |

OTHER PUBLICATIONS

International Search Report (English Translation) PCT/EP2015/077029, dated Mar. 14, 2016. (2 pages).

\* cited by examiner

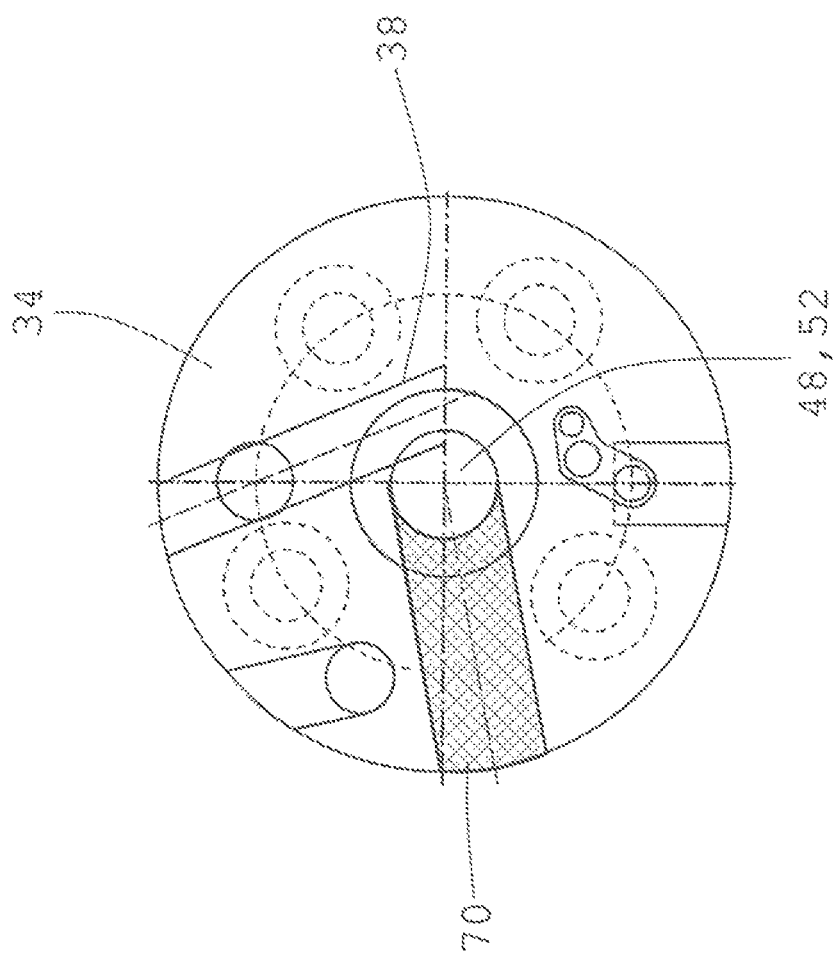

JAW CLUTCH

FIELD OF THE INVENTION

The invention relates generally to a dog clutch with an axially fixed coupling element and an axially movable coupling element.

BACKGROUND

Positively locking dog clutches are used, for example, in automated manual transmissions. To enable quick and comfortable gear shift operations, it is necessary that, during a gear shift operation of a transmission control, the engagement status of the respective dog clutch is transmitted. For this purpose, a position sensor may be used, which determines an end position of an axially movable part of the dog clutch and passes the relevant information on to the transmission control.

A coupling device with an input side and an output side, which can be connected to one another in a force locking manner via a positively locking shift element and a friction-locking shift element and again separated, is known from DE 10 2012 202 496 A1. An associated actuator device has at least one piston-cylinder unit to which pressure can be applied with a pressurizing medium for the successive actuation of the positively locking and friction-locking shift element. A sensor configured as a reed switch is provided on the cylinder, by which the axial end position of the piston can be identified and with it, at the same time, the current shift condition of the dog clutch can be determined. The position data supplied by this sensor may, for example, be forwarded to a transmission control and processed further there, in particular to optimize the gear shift operations. One disadvantage of this previously known coupling device is that only the axial position of the piston can be identified by the sensor, so that the only digital information available to the transmission control is whether the clutch is open or closed. This results in relatively long reaction times for the transmission control with an inconclusive position determination of the actuating piston.

A differential gear assembly and a drive assembly with such a differential gear assembly is further known from DE 10 2009 056 088 A1. Among other things, the differential gear assembly includes a shifting clutch disposed between an input gear and the differential gear. In an engaged state of the shifting clutch, the torque is transmitted from the input gear to the differential gear, while, in a disengaged state of the clutch, torque transmission is suspended. The differential gear assembly additionally includes an actuator for actuating the shifting clutch and a sensor for determining at least three shift positions of the shifting clutch, which collaborates with a transmitter element that, in one embodiment, is ring-shaped. One disadvantage of this differential gear assembly is that the sensor and the transmitter element are mounted outside the shifting clutch, i.e. outside the differential gear assembly, so that they are subjected to adverse ambient influences, which have a negative effect on measurement accuracy.

SUMMARY OF THE INVENTION

In view of the above, example aspects of the invention are directed to a dog clutch, in which a continuous, as well as sufficiently accurate, identification of the respective current displacement path position of the axially movable part of the dog clutch is possible, and that is also cost-effective to manufacture and constructed in a space-saving manner.

Accordingly, a dog clutch with an axially fixed coupling element and an axially movable coupling element is proposed, in which the axially fixed coupling element and the axially movable coupling element are configured to be sleeve-shaped and are disposed coaxially to one another, in which the axially movable coupling element is axially displaceable by a pressurizing medium-actuatable piston to establish a positively locking connection with the axially fixed coupling element, in which the piston is disposed in a longitudinally displaceable manner in a cylinder housing, which radially on the outside carries the axially movable coupling element, in which the piston is connected to the axially movable coupling element via a piston pin, and in which a pressurizing medium can be supplied to the cylinder space of the cylinder housing via a supply duct, wherein, at one axial end, the piston is firmly connected to a coaxially aligned sensor bolt and, on a sensor section in the area of its free, piston-remote axial end the sensor bolt is configured as a sensor or transmitter element for a position sensor.

This dog clutch allows precise measurement of the position of the movable coupling element along the entire clutch path, so that not only the end positions of the axially movable coupling element can be accurately determined, but intermediate positions as well. Knowing this position information enables a transmission control of an automated manual transmission, for example, to perform precisely controlled gear shift operations during a gear change. This is in particular especially advantageous for the release of out-of-mesh positions of the two coupling elements that occur in certain operating situations.

A clutch stroke or path may be allocated to each position of the axially movable coupling element to be measured, which specifies the axial distance, i.e. the distance that has to be covered for the transition between the fully engaged and the fully disengaged state of the dog clutch and vice versa, between the two coupling elements which can be brought into engagement with one another in a positively locking manner, or at least one other component correspondingly moving with it.

In an advantageous further example development of the described dog clutch, the piston includes a rotationally symmetric cup-shaped piston recess about its longitudinal center axis, that a mounting section of the sensor bolt is disposed in the piston recess, that in the area of the piston recess the piston includes a radial transverse bore and the mounting section of the sensor bolt includes a radial transverse bore, said transverse bores being coaxial to each other and aligned perpendicular to the longitudinal center axis, and that the piston, the sensor bolt and the axially movable coupling element are connected to one another through the piston pin, by inserting the piston pin into said radial transverse bores and connected to the axially movable coupling element. The piston pin thereby firmly, but detachably, connects a total of three components to one another, thus facilitating the manufacturing and assembly of the dog clutch.

Any radial clearance or play between the piston recess and the associated mounting section of the sensor bolt is designed to be such that, even at maximum radial offset, jamming or tilting of the sensor bolt in the piston is reliably excluded. Alternatively, the sensor bolt and the piston can be configured as a single component.

According to another further example development, the position sensor and the sensor section of the sensor bolt are configured and disposed relative to one another in such a way, that the respective axial position of the piston-remote axial end of the sensor bolt, and thus indirectly the axial position of both the piston and the axially movable coupling element, can be measured in a continuous manner. The design of the position sensor and the sensor section of the sensor bolt are accordingly selected to correlate or configured to be mutually compatible; such that not only the end positions of the displacement can be determined with good accuracy, but the intermediate positions as well.

In a more specific example embodiment, the sensor section of the sensor bolt includes a geometry that differs geometrically from a cylinder jacket or lateral surface in such a way that the distance between the sensor and the sensor section of the sensor bolt is dependent or varies as a function of the respective axial position of the sensor bolt. The sensor section of the sensor bolt may be configured as a circumferential recess that is generally V-groove-shaped when viewed in longitudinal section. It is also possible, however, that the recess is formed in an axially ramped fashion on only one side. The recess on the sensor section preferably extends over a distance that is at least equal in length to the maximum displacement of the axially movable coupling element.

According to another example embodiment, the mounting section of the piston is sealed with respect to the piston recess by a sealing element. The cylinder space is thereby kept pressure-tight, and an outflow of the pressurizing medium into other areas of the transmission is prevented. An O-ring is preferably used as the sealing element.

According to a further advantageous example embodiment, the cylinder housing is firmly connected to or integrally formed with a pressurizing medium supply flange, and that a cylindrical bearing section of the sensor bolt is accommodated in a pilot bore of the pressurizing medium supply flange in a longitudinally displaceable manner. This allows reliable mounting and guidance of the sensor bolt within the actuation device of the dog clutch.

According to a further advantageous example embodiment, a sleeve, which rests axially on a collar of the pilot bore of the pressurizing medium supply flange, is inserted in the pilot bore, and that the bearing section of the sensor bolt is accommodated in the sleeve. The sleeve is hereby reliably fixed in the pressurizing medium supply flange, and a smooth axial mobility in the mounting of the sensor bolt is guaranteed as well. The sleeve may, for example, be made of a low friction plastic such as a rubber-like elastomer. In order to prevent the bearing section of the sensor bolt from burying itself, said bearing section overlaps the axial ends of the sleeve in all axial positions.

In an alternative example embodiment, the bearing section of the sensor bolt is accommodated in the pilot bore in a longitudinally displaceable manner, and the bearing section is at least in areas provided with a low friction material. The sleeve as a separate component is therefore no longer necessary, which results in a minimization of the manufacturing and assembly costs.

According to a further example embodiment, it is provided that the mounting section and the bearing section of the sensor bolt are connected to one another via a cylindrical connecting section with a reduced diameter. In this way, the mass of the sensor bolt to be moved is reduced in comparison to a variant without a diameter reduction, thus increasing the achievable displacing acceleration of the dog clutch as a whole, with the same displacing force. This further results in material savings, which can, among other things lead to a reduction in manufacturing costs. The diameter of the mounting section and the bearing section of the sensor bolt are approximately equal.

According to a further example embodiment, it is provided that, at least in sections, the supply duct in the pressurizing medium supply flange is inclined at an angle to a common longitudinal center axis of piston and sensor bolt and opens tangentially into the pilot bore. The initial result of the pressurizing medium being brought in tangentially is the reduction of the radial force caused by the flow of the pressurizing medium and acting on the sensor bolt. A deflecting contour or a baffle plate can alternatively be provided within the pressurizing medium supply flange to bring the flow of the pressurizing medium in the direction of the piston to the sensor bolt in such a way that said sensor bolt is not subjected to any appreciable radial force.

It is preferably provided that the pressurizing medium supply flange is connected with a transmission housing wall in a pressure-tight manner. The connection is preferably achieved by a bolt connection. This results in a pressure-tight mounting of the pressurizing medium supply flange on the transmission housing wall.

With regard to the specific arrangement of the position sensor, said position sensor may be disposed in the area of the transmission housing wall as well as radially above the sensor section of the sensor bolt, wherein the longitudinal center axis of the position sensor is inclined at a setting angle of thirty degrees (30°) to ninety degrees (90°) to the common longitudinal center axis of the sensor bolt and the piston. This allows the installation space necessary for the integration of the position sensor in the transmission housing wall to be kept small. For this purpose, the position sensor is, for example, inserted into a recess in the transmission housing wall.

According to another further development, it is provided that, centrically to the common longitudinal center axis of sensor bolt and piston and adjacent to the pilot bore, a cup-shaped additional space is formed in the transmission housing wall, into which, at a distance to the walls of the additional space, the axial, piston-remote end of the sensor bolt partially projects. With this configuration, even at low operating temperatures, the pressurizing medium can reliably flow out of the pressurizing medium supply flange to disengage the dog clutch, i.e. axially displace the sensor bolt toward the additional space, so that the clutch always functions properly.

According to a further example embodiment, the sensor bolt includes a flat area on its free axial end and/or the mounting section of the sensor bolt includes a lead-in chamfer on its piston-side end. Among other things, this allows the mounting of the sensor bolt to be simplified.

Finally, the supply duct in the pressurizing medium supply flange may be connected with a peripheral connecting duct in the transmission housing wall. With the peripheral connecting duct, the pressurizing medium can be supplied to the dog clutch from the outside, in particular from other areas of an automatic transmission.

With the use of hydraulic oil as a pressurizing medium, the movable coupling element can be actuated at a substantially higher force than when using a gaseous pressurizing medium, so that a reliable engagement and disengagement of the dog clutch is possible under all operating conditions.

BRIEF DESCRIPTION OF THE DRAWINGS

To better understand the invention, the description is accompanied by a drawing of a design example. Similar constructive components in the drawings always have the same reference numerals. The drawings show:

FIG. 3 an axial rear view of a pressurizing medium supply flange of the dog clutch in accordance with FIGS. 1 and 2.

DETAILED DESCRIPTION

Figure 1:
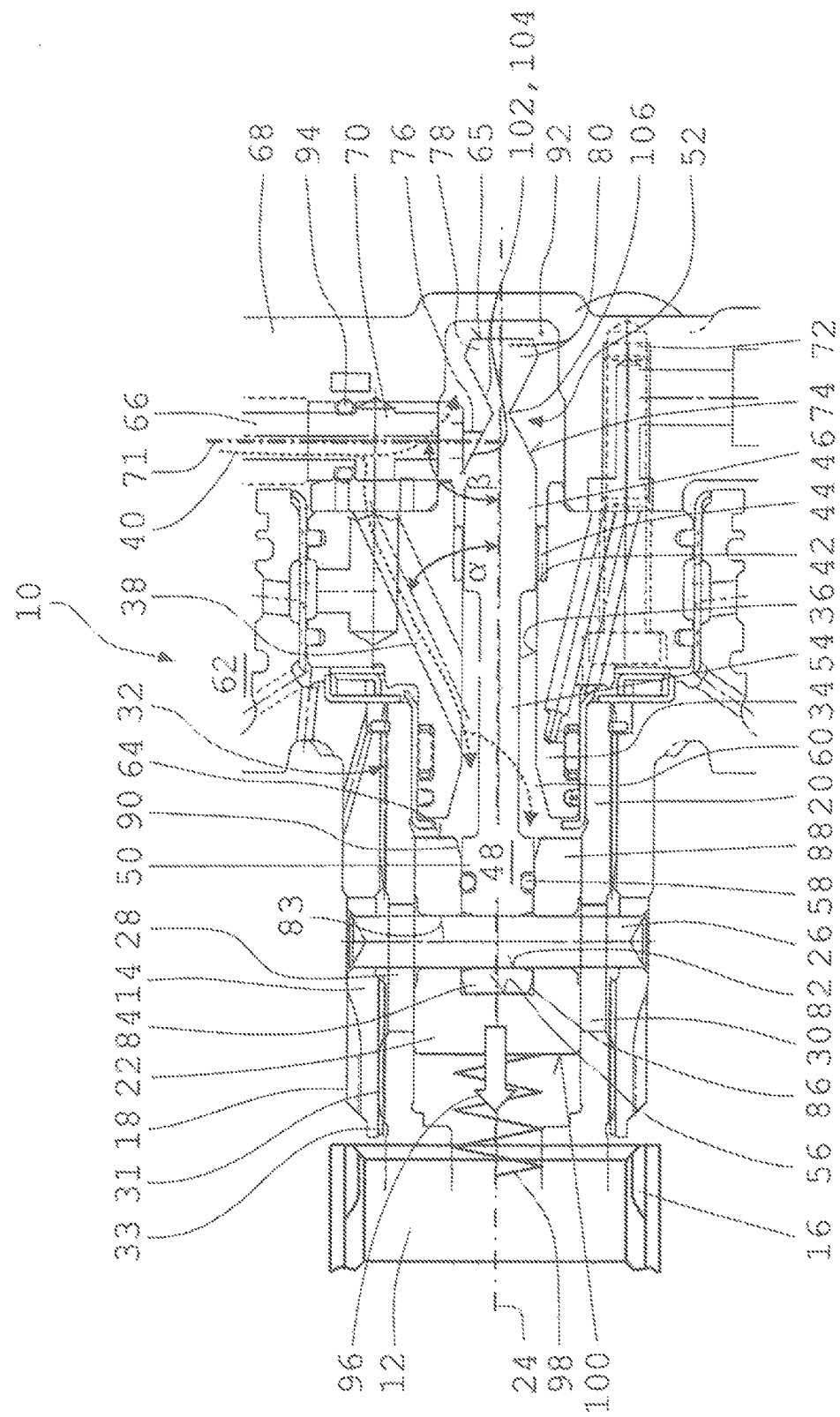
FIG. 1 a longitudinal section through the dog clutch in the open state.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
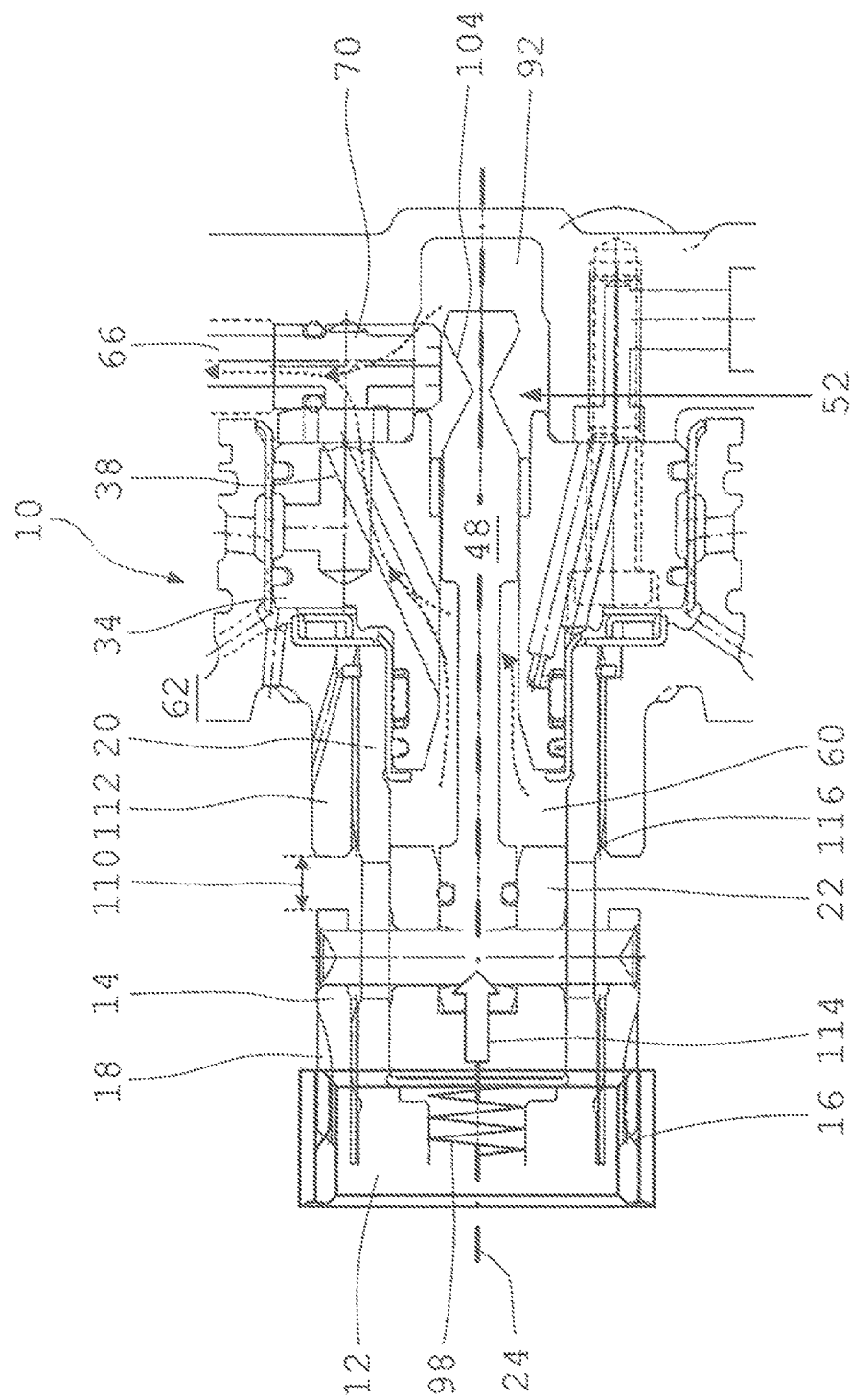
FIG. 2 a longitudinal section through the dog clutch in the closed state.

The dog clutch 10 shown in FIGS. 1 to 3 includes a fixed coupling element 12 and an axially movable coupling element 14. The two coupling elements 12, 14 are respectively substantially formed as hollow cylinders, wherein the fixed coupling element 12 includes an axial internal gearing 16 and the movable coupling element 14 includes an axial external gearing 18, the teeth of which fit into the tooth gaps of the respective other gearing. The two coupling elements 12, 14 are coaxially disposed, so that, in axial direction, the smaller-diameter movable coupling element 14 can be inserted partially into the fixed coupling element 12. This creates a positively locking connection, which allows a transmission of torque between the two coupling elements 12, 14.

For the actuation of the dog clutch 10, said dog clutch 10 further has an approximately hollow cylindrical cylinder housing 20, in which a cup-like piston 22 is accommodated displaceably and coaxial to its longitudinal center axis 24. The movable coupling element 14 is disposed radially above the cylinder housing 20 and displaceable upon the cylinder housing 20 coaxially to the longitudinal center axis 24. The piston 22 and the cylinder housing 20 form a pressurizing medium-operated actuator for displacing the movable coupling element 14. For this purpose, the piston 22 is connected to the movable coupling element 14 by a piston pin 26, which extends transverse to the longitudinal center axis 24.

To allow both the axial displaceability of the movable coupling element 14 and the connection thereof to the piston 22 by the piston pin 26, two oblong holes 28, 30, which are configured to be diametrically opposite to one another with respect to the longitudinal center axis 24 in the cylinder housing 20, are formed in the cylinder housing 20. An external longitudinal gearing 31 is formed on the cylinder housing 20 and an internal axial gearing 33 with a shallow depth of engagement is formed on the movable coupling element 14 to guide and prevent rotation of the movable coupling element 14, wherein the prevention of rotation is additionally ensured by the two oblong holes 28, 30 in the cylinder housing 20 and the piston pin 26 inserted therein.

A substantially hollow cylindrical pressurizing medium supply flange 34, which is configured to be rotationally symmetric to the longitudinal center axis 24, is disposed on the cylinder housing 20 in the area of a piston-remote hollow cylindrical end section 32 of said cylinder housing. A continuous pilot bore 36, into which a supply duct 38 for a pressurizing medium 40, inclined in this design example at a setting angle α of about twenty-two and a half degrees (22.5°) to the longitudinal center axis 24, opens, extends centrically to the longitudinal center axis 24 in the pressurizing medium supply flange 34. The pressurizing medium 40 used is preferably a hydraulic oil of suitable viscosity.

A circular collar 42, against which a hollow-cylindrical sleeve 44 axially rests, is formed in the pilot bore 36. A cylindrical bearing section 46 of a sensor bolt 48, which is displaceable parallel to the longitudinal center axis 24, is accommodated in the sleeve 44. Independent of the respective axial position of the sensor bolt 48, to prevent excessive wear, the sleeve 44 always surrounds the bearing section 46 of said sensor bolt as a slide bearing.

The sleeve 44 is preferably made of a low-friction plastic, for example a rubber-like elastomer, or something similar, while the sensor bolt 48 and the pressurizing medium supply flange 34 are made of steel.

The sensor bolt 48 includes a mounting section 50 on the piston 22 facing end of the sensor bolt 48, and a sensor section 52 in the area of an free axial end 78 of the sensor bolt 48. The mounting section 50 and the bearing section 46 are connected to one another by a connecting section 54 with a reduced diameter. The sleeve 44 and the collar 42 in the pilot bore 36 in the pressurizing medium supply flange 34 can be omitted if, in an alternative embodiment, the bearing section 46 of the sensor bolt 48 itself is, at least in areas, coated with a low-friction material.

The substantially cylindrical mounting section 50 of the sensor bolt 48 is accommodated in a cup-shaped piston recess 56 of the piston 22, and is simultaneously connected to both the piston 22 and the movable coupling element 14 by the piston pin 26. A sealing element 58, which is configured here as an O-ring inserted into a piston groove, is disposed between the piston recess 56 and the mounting section 50 of the sensor bolt 48.

The seal between a cylinder space 60 of the cylinder housing 20 and, for example, adjacent areas of an automated manual transmission 62 not shown in more detail, is achieved by the piston-side sealing element 58. Due to its hydraulic sealing effect, the sealing element 58 additionally creates two pressure surfaces 64, 65 on the piston 22 and on the piston-remote end 78 on the sensor bolt 48. The pressure surface 64 on the piston 22 has an annular geometry, while the pressure surface 65 the piston-remote end 78 of the sensor bolt 48 is circular. The overall surface area, which upon application of pressure on the piston 22 and the sensor bolt 48 with a pressurizing medium is hydraulically effective in terms of actuating force, is therefore the sum of both pressure surfaces 64, 65, so that an actuation force of the dog clutch 10 that can be created by the piston 22 is not impaired by the presence of the sensor bolt 48.

Radial play between the piston recess 56 and the mounting section 50 of the sensor bolt 48 is designed to be such that jamming is excluded, even at a maximum radial offset. Between the piston pin 26 and the mounting section 50 of the sensor bolt 48, there is likewise such a large amount of play that, even in case of a maximum radial offset, jamming is reliably excluded.

The supply duct 38 in the pressurizing medium supply flange 34, which is inclined at an angle α, is in flow connection with a connecting duct 66 in the area of a transmission housing wall 68, which extends transverse to the longitudinal center axis 24. Starting from a peripheral pressurizing medium source, the supply of said piston-cylinder assembly of the dog clutch 10 with the operationally necessary pressurizing medium 40 is carried out via the connecting duct 66.

In a design variant not shown in the figures, the pressurizing medium supply in the pressurizing medium supply flange 34 can also be performed in an axial manner without the angled supply duct 38. However, a metallic seal would be required between the pressurizing medium supply flange 34 and the transmission housing wall 68 that must be effective across the entire operating temperature range of the dog clutch 10. In this context, particularly the different coefficients of thermal expansion of the transmission housing wall 68 and the pressurizing medium supply flange 34 have to be taken into consideration, because the pressurizing medium supply flange 34 is usually made of a steel alloy, while the transmission housing wall 68 preferably consists of an aluminum alloy.

A cylindrical position sensor 70 is disposed above the sensor section 52 of the sensor bolt 48. The longitudinal center axis 71 of the position sensor 70 extends at a setting angle β to the longitudinal center axis 24, wherein a value of ninety degrees (90°) is selected here for the angle β solely as an example. An inclined installation position of the sensor 70 at a setting angle β of thirty degrees (30°) to ninety degrees (90°) is possible, in particular to be able to better account for restricted installation space conditions.

Simply for the sake of completeness, it should be mentioned here that the pressurizing medium supply flange 34 is bolted to the transmission housing wall 68 by an internal bolt 72.

On its side facing the sensor section 52, the position sensor 70 can have a surface geometry that approximates the surface geometry of a half cylinder, which results in optimum adaptation of the position sensor 70 to the cross-section geometry of the sensor section 52. The cross-section geometry of the sensor section 52 of the sensor bolt 48 along the longitudinal center axis 24 thus corresponds to respective circular areas with different diameters.

As an example, the sensor section 52 has a circumferential recess 74 that is V-shaped when viewed in longitudinal section. A vertical distance 76 between the recess 74 and the position sensor 70 can thus be identified by the position sensor 70. When the sensor bolt 48, and with it its sensor section 52, moves coaxially to the longitudinal center axis 24, the distance 76 also changes proportionally to the displacement, in an unambiguously evaluable manner. From this, with the aid of a suitable electronic evaluation system, the axial displacement of the sensor bolt 48 and with it the axial position of both the piston 22 and the movable coupling element 14 can be recorded continuously and with high precision. As a result, the exact axial position of the movable coupling element 14 is known to the transmission control at all times, so that gear shift operations or gear changes within the automatic transmission 62 can be performed in an optimum manner. In a departure from the V-shaped design of the recess 74, as long as an unambiguous determination of the axial position of the sensor bolt 48 is ensured, the contouring of said recess 74 can be different.

To facilitate the rotation of the sensor bolt 48 about its longitudinal center axis 24 during assembly, the free axial end 78 of the sensor bolt 48 has a flat area 80 on both sides as a contact surface for a tool. In this way, in particular the alignment of the transverse bore 82 in the mounting section 50 of the sensor bolt 48 for insertion of the piston pin 26 through the transverse bore 82 of the sensor bolt 48 and through a transverse bore 83 in the piston 22, is simplified during assembly of the dog clutch 10. In the assembled state, through the connection with the piston pin 26, i.e. with the movable coupling element 14, the sensor bolt 48 is secured against rotation about the longitudinal center axis 24.

To facilitate the insertion of the mounting section 50 of the sensor bolt 48 into the cup-shaped piston recess 56 of the piston 22 during assembly of the dog clutch 10, the mounting section 50 of the sensor bolt 48 additionally has a circumferential, beveled lead-in chamfer 86 on its end 84 facing the piston recess 56. For the same purpose, an inclined lead-in chamfer 90 is configured radially on the inside of the open end 88 of the piston 22.

A cup-shaped additional space 92 for dynamic pressure reduction is additionally configured in the transmission housing wall 68. This additional space 92 is disposed centrically to the common longitudinal center axis 24, in such a manner that it represents an axial continuation of the pilot bore 36. The additional space 92 is also fluidically connected to the connecting duct 66. This allows the liquid pressurizing medium 40, represented with dotted arrows, to flow into or out of the cylinder space 60 and the additional space 92 sufficiently quickly, even at low temperatures, so that a proper functioning of the clutch is ensured.

To minimize the effect of a radial clearance which may occur between the sleeve 44 and the bearing section 46, which could lead to an impairment of the measurement accuracy of the distance 76, and at the same time suppress a lever action of the sensor bolt 48 in case of any wobbling that may occur, the sleeve 44, which together with the bearing section 46 of the sensor bolt 48 forms a slide bearing, is disposed as close in axial direction to the position sensor 70 as possible.

The position sensor 70 is preferably configured as a contact-free Hall sensor and sealed with respect to the transmission housing wall 68 by a further sealing element 94, here in the form of an O-ring or the like.

In the actuating position shown in FIG. 1, the dog clutch 10 is in the disengaged state, so that there is no positively locking connection between the external gearing 18 of the axially displaceable coupling element 14 and the internal gearing 16 of the axially fixed coupling element 12, and there can therefore be no transmission of torque between the two coupling elements 12, 14. To shift the dog clutch 10 from the position shown in FIG. 1 to the engaged, i.e. closed, state, the pressurizing medium 40 flows from the connecting duct 66 over the supply duct 38 (as indicated by the dotted arrow lines) into the cylinder chamber 60 of the cylinder housing 20 as well as into the pilot bore 36 and into the cup-shaped additional space 92. In doing so, the pressurizing medium 40 is pressed into these spaces, or pressurizing medium 40 that is already present there is subjected to overpressure.

Due to the pressure effect of the pressurizing medium 40 on the two pressure surfaces 64, 65 on the piston 22 and on the piston-remote axial end 78 of the sensor piston 48, the piston 22 inside the cylinder housing 20 moves to the left in the direction of the first arrow 96 parallel to the longitudinal center axis 24 as in FIG. 1. When this axial actuating movement occurs, the piston 22 takes the axially movable coupling element 14 and the sensor bolt 48 along with it due to the piston pin 26. As a result of this, the movable coupling element 14 moves towards the fixed coupling element 12 and the recess 74 of the sensor section 52 of the sensor bolt 48 moves under the position sensor 70, which allows a high-precision determination of the respective current axial position of the sensor bolt 48 and with it the determination of the axial position of the movable coupling element 14.

This axial actuating movement of the pressurizing medium-operated piston 22 continues until the position of the dog clutch 10 shown in FIG. 2 is reached, in which the positively locking connection between the external gearing 18 the movable coupling element 14 and the internal gearing 16 the fixed coupling element 12 is established and a transmission of torque between the two coupling elements 12, 14 can take place.

The axial actuating movement can, for example, be carried out against the force effect of a pressure spring 98, drawn here only as an example, to enable an automatic or self-actuating resetting movement of the piston 22 to open the dog clutch 10 when the cylinder space 60 and the additional space 92 are not pressurized. Alternatively, when the cylinder space 60 and the additional space 92 are not pressurized, a sensor piston-remote axial exterior surface 100 of the piston 22, for example, can be pressurized with the pressurizing medium 40 to perform the resetting movement of the piston 22 to open the dog clutch 10.

The circumferential V-shaped recess 74 in the sensor section 52 of the sensor bolt 48 includes two axially adjacent circumferential sections 102, 104, wherein, by definition, the first section 102 has a negative slope and the second section 104 has a positive slope. The oppositely inclined sections 102, 104 of the recess 74 of the sensor section 52 form a surface geometry which corresponds to that of two frustrums abutting in the area of their tapered ends. This special surface geometry of the recess 74 ensures that, as a result of the axial actuating movement of the sensor bolt 48, starting from the axial position of the sensor bolt 48 shown in FIG. 1 until reaching the position of the sensor bolt 48 shown in FIG. 2, the said distance 76 initially increases and, after passing through a circumferential base 106 of the recess 74, which at the same time marks the transition between the two sections 102, 104, the distance 76 again decreases. This allows an unambiguous determination of the axial position of the sensor bolt 48 and with it the axial position of the associated movable coupling element 14. In comparison to a simple, in a longitudinal section of the sensor bolt 48 triangular-shaped recess, for example, the previously described embodiment has the advantage that, for the same maximum axial measurement path, less depth is necessary in radial direction in the sensor bolt 48 in a V-shaped recess 74, which results in reduced material weakening of the sensor bolt 48.

FIG. 2 shows a longitudinal section through the dog clutch of FIG. 1, but in the fully engaged state of the dog clutch. In the shift condition shown in FIG. 2, starting from its axial position in FIG. 1, the movable coupling element 14 has moved so far toward the axially fixed coupling element 12 that the external gearing 18 of the axially movable coupling element 14 is fully engaged with the internal gearing 16 of the axially stationary coupling element 12. This creates a positively locking connection between the two coupling elements 12, 14 and a transmission of torque can take place. Including the additional area 92 and starting from the connecting duct 66 and the supply duct 38, the cylinder space 60 of the cylinder housing 20 is completely filled with the pressurizing medium 40 that is still under excess pressure, so that, against the force effect of the pressure spring 98, the piston 22 still occupies the position shown in FIG. 2, in which the dog clutch 10 is in the closed state, and in which it remains for the time being.

To achieve this fully engaged position of the dog clutch 10, the movable coupling element 14, i.e. the piston 22, has to travel an axial clutch path 110, which as an example is drawn here between the axially movable coupling element 14 and a component 112 of the transmission 62 that encloses the cylinder housing 20 in a sleeve-like manner. The aforementioned component 112 recognizably includes an axial internal gearing 116, into which a not further identified external axial gearing of the cylinder housing 20 is inserted in a rotationally fixed and axially secured manner. In the shown engaged position of the dog clutch 10, the second section 104 of the recess 74 of the sensor section 52 of the sensor bolt 48, which has a positive slope, is radially below the position sensor 70 and thus within its metrological detection range.

Starting from the fully engaged position of the dog clutch 10 shown in FIG. 2, when the cylinder space 60 and the additional space 92 have become unpressurized and/or the pressurizing medium 40 has at least partially flowed out of these spaces via the supply duct 38 and the connecting duct 66, due to the force effect of the pressure spring 98 or some other effect mechanism, the piston 22 can move back in the direction of a second arrow 114 until the completely released or disengaged condition of the dog clutch 10 shown in FIG. 1 is reached again.

FIG. 3 shows a schematic axial rear view of the pressurizing medium supply flange 34. This shows that, to lessen radial forces on the supply duct resulting from the flow of the pressurizing medium, the supply duct 38 within the pressurizing medium supply flange 34 extends tangentially to the longitudinal extension of the sensor bolt 48. FIG. 3 also shows the position of the position sensor 70 in relation to the sensor section 52 of the sensor bolt 48. Alternatively, a not depicted suitable guide contour, or a likewise not shown deflector plate, can be provided on the pressurizing medium supply flange 34.

Modifications and variations can be made to the embodiments illustrated or described herein without departing from the scope and spirit of the invention as set forth in the appended claims.

REFERENCE NUMERALS

10 Dog clutch
12 Fixed coupling element
14 Axially movable coupling element
16 Internal gearing on the fixed coupling element
18 External gearing on the movable coupling element
20 Cylinder housing
22 Cup-shaped piston
24 Common longitudinal center axis
26 Piston pin
28 First oblong hole in the cylinder housing
30 Second oblong hole in the cylinder housing
31 External axial gearing on the cylinder housing
32 Hollow cylindrical end section of the cylinder housing
33 Internal axial gearing on the axially movable coupling element
34 Pressurizing medium supply flange
36 Pilot bore in the pressurizing medium supply flange
38 Supply duct
40 Pressurizing medium
42 Collar in the pilot bore
44 Sleeve
46 Bearing section on the sensor bolt
48 Sensor bolt
50 Mounting section on the sensor bolt
52 Sensor section on the sensor bolt
54 Connecting section on the sensor bolt
56 Piston recess
58 Sealing element on the piston, O-ring
60 Cylinder space
62 Automatic or automated manual transmission
64 Effective pressure surface on the piston
65 Effective pressure surface on the sensor bolt 66 Connecting duct
68 Transmission housing wall
70 Position sensor
71 Longitudinal center axis of the position sensor
72 Screw bolt
74 Recess on the sensor section of the sensor bolt
76 Distance between the sensor section and the sensor
78 Free axial end of the sensor bolt
80 Flat area on the free end of the sensor bolt
82 Transverse bore in the mounting section of the sensor bolt
83 Transverse bore in the piston
84 Piston-side end of the sensor bolt
86 Lead-in chamfer on the piston-side end of the sensor bolt
88 Open end of the piston
90 Lead-in chamfer on the open end of the piston
92 Additional space
94 Sealing element on the position sensor, O-ring
96 First arrow
98 Pressure spring
100 Exterior surface of the piston
102 First section of a V-shaped recess on the sensor bolt
104 Second section of a V-shaped recess on the sensor bolt
106 Base of the V-shaped recess on the sensor bolt
110 Clutch path
112 Component of the transmission
114 Second arrow
116 Internal axial gearing of component 112
αSetting angle of supply duct 38
βSetting angle of the position sensor

The invention claimed is:

1. A dog clutch (10), comprising:
an axially fixed coupling element (12) and an axially movable coupling element (14) that are sleeve-shaped and disposed coaxially with each other;
a pressurizing medium-actuatable piston (22) for axially displacing the axially movable coupling element (14) in order to establish a positively locking connection between the axially fixed coupling element (12) and the axially movable coupling element (14); and
a cylinder housing (20) in which the piston (22) is disposed in a longitudinally displaceable manner, the cylinder housing (20) radially supporting the axially movable coupling element (14), the piston (22) connected to the axially movable coupling element (14) via a piston pin (26) in the cylinder housing (20), a pressurizing medium (40) suppliable into a cylinder space (60) of the cylinder housing (20) via a supply duct (38),
wherein the piston (22) is firmly connected to a sensor bolt (48) at one axial end of the sensor bolt (48), the piston (22) is coaxially aligned with the sensor bolt (48), and the sensor bolt (48) is configured as a sensor element for a position sensor (70) at a sensor section (52) of the sensor bolt (48) that is positioned on a free, piston-remote axial end (78) of the sensor bolt (48).

2. The dog clutch of claim 1, wherein:
the piston (22) comprises a rotationally symmetric cup-shaped piston recess (56) about a longitudinal center axis (24) of the piston (22);
a mounting section (50) of the sensor bolt (48) is disposed in the piston recess (56);
the piston (22) defines a radial transverse bore (83) and the mounting section (50) of the sensor bolt (48) defines a radial transverse bore (82) proximate the piston recess (56);
said radial transverse bores (82, 83) are coaxial and oriented perpendicular to the longitudinal center axis (24) of the piston (22); and
the piston (22), the sensor bolt (48) and the axially movable coupling element (14) are connected to one another via the piston pin (26) by the piston pin (26) being inserted into the radial transverse bores (82, 83) and connected to the axially movable coupling element (14).

3. The dog clutch of claim 2, wherein the mounting section (50) of the piston (22) is sealed with respect to the piston recess (56) by a sealing element (58).

4. The dog clutch of claim 2, wherein the cylinder housing (20) is fixed to or integrally formed with a pressurizing medium supply flange (34), and a cylindrical bearing section (46) of the sensor bolt (48) is disposed in a pilot bore (36) of the pressurizing medium supply flange (34) such that the cylindrical bearing section (46) of the sensor bolt (48) is longitudinally displaceable within the pilot bore (36).

5. The dog clutch of claim 4, wherein a sleeve (44) is disposed in the pilot bore (36) of the pressurizing medium supply flange (34) such that the sleeve (44) is axially positioned on a collar (42) of the pilot bore (36), and the bearing section (46) of the sensor bolt (48) is positioned in the sleeve (44).

6. The dog clutch of claim 4, wherein the bearing section (46) of the sensor bolt (48) is longitudinally displaceable within the pilot bore (36), and the bearing section (46) comprises a low friction material.

7. The dog clutch of claim 4, wherein the mounting section (50) of the sensor bolt (48) and the bearing section (46) of the sensor bolt (48) are connected to one another by a cylindrical connecting section (54), and the cylindrical connecting section (54) has a reduced diameter relative to the mounting section (50) and the bearing section (46) of the sensor bolt (48).

8. The dog clutch of claim 4, wherein the supply duct (38) in the pressurizing medium supply flange (34) is at least partially inclined at an angle (α) to a common longitudinal center axis (24) of the piston (22) and the sensor bolt (48), and the supply duct (38) opens tangentially into the pilot bore (36).

9. The dog clutch of claim 4, wherein the pressurizing medium supply flange (34) is connected with a transmission housing wall (68) in a pressure-tight manner.

10. The dog clutch of claim 4, wherein a cup-shaped additional space (92) is formed in a transmission housing wall (68) centrically to a common longitudinal center axis (24) of the sensor bolt (48) and the piston (22) and adjacent to the pilot bore (36), and the sensor section (52) of the sensor bolt (48) partially projects into the cup-shaped additional space (92).

11. The dog clutch of claim 1, wherein the position sensor (70) and the sensor section (52) of the sensor bolt (48) are configured and disposed in relation to one another such that the axial position of the piston-remote axial end (78) of the sensor bolt (48) and thereby the axial position of both the piston (22) and the axially movable coupling element (14) are measurable in a continuous manner.

12. The dog clutch of claim 1, wherein the sensor section (52) of the sensor bolt (48) has a geometry that differs from a cylindrical outer surface geometry such that a distance (76) between the sensor (70) and the sensor section (52) of the sensor bolt (48) varies as a function of the axial position of the sensor bolt (48).

13. The dog clutch of claim 12, wherein the sensor section (52) of the sensor bolt (48) has a circumferential recess (74) that is V-groove-shaped in a longitudinal section plane.

14. The dog clutch of claim 1, wherein the position sensor (70) is disposed proximate a transmission housing wall (68) and radially above the sensor section (52) of the sensor bolt (48), and a longitudinal center axis (71) of the position sensor (70) is inclined at a setting angle (13) of no less than thirty degrees and no more than ninety degrees to a common longitudinal center axis (24) of the sensor bolt (48) and the piston (22).

15. The dog clutch of claim 1, wherein the sensor bolt (48) comprises a plurality of flat areas (80) on the piston-remote axial end (78) of the sensor bolt (48).

16. The dog clutch of claim 1, wherein a mounting section (50) of the sensor bolt (48) comprises a lead-in chamfer (86) on a piston-side end (84) of the mounting section (50).

17. The dog clutch of claim 1, wherein the supply duct (38) in a pressurizing medium supply flange (34) is connected with a peripheral connecting duct (66) in a transmission housing wall (68).

* * * * *

UNITED STATES PATENT AND TRADEMARK OFFICE
CERTIFICATE OF CORRECTION

PATENT NO. : 10,302,146 B2  
APPLICATION NO. : 15/536850  
DATED : May 28, 2019  
INVENTOR(S) : Hagen Doepfert et al.

Page 1 of 1

It is certified that error appears in the above-identified patent and that said Letters Patent is hereby corrected as shown below:

On the Title Page

Item (73) Assignee reads "ZP FRIEDRICHSHAFEN AG" should read "ZF FRIEDRICHSHAFEN AG"

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*